Nov. 28, 1967     N. LAING     3,354,833

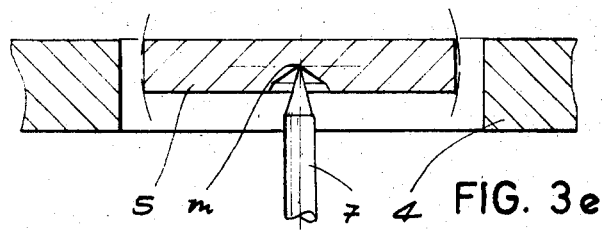
FIG. 3e
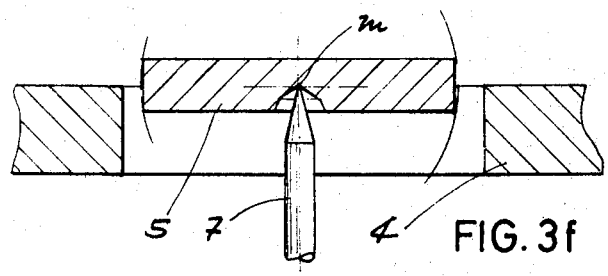
FIG. 3f
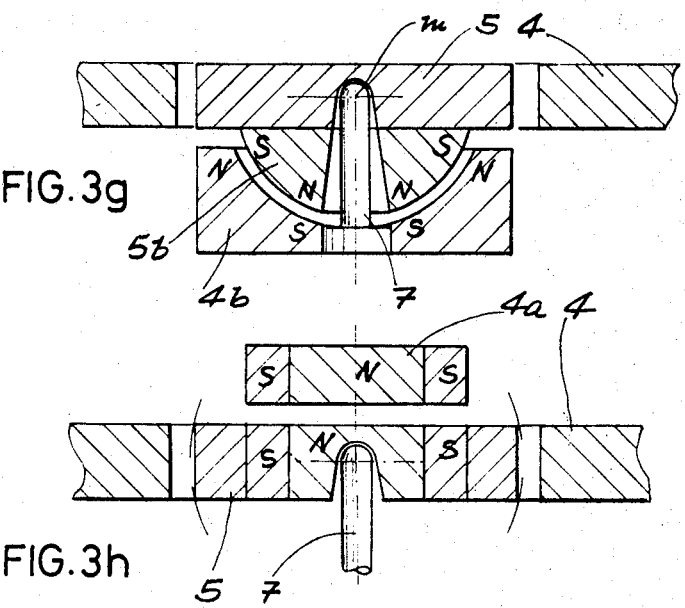
FIG. 3g
FIG. 3h

DEVICE FOR THE MAGNETIC TRANSMISSION OF TORQUE

Filed Nov. 26, 1965     14 Sheets-Sheet 7

Nov. 28, 1967      N. LAING      3,354,833
DEVICE FOR THE MAGNETIC TRANSMISSION OF TORQUE
Filed Nov. 26, 1965      14 Sheets-Sheet 8

Nov. 28, 1967     N. LAING     3,354,833

DEVICE FOR THE MAGNETIC TRANSMISSION OF TORQUE

Filed Nov. 26, 1965     14 Sheets-Sheet 12

Nov. 28, 1967  N. LAING  3,354,833
DEVICE FOR THE MAGNETIC TRANSMISSION OF TORQUE
Filed Nov. 26, 1965  14 Sheets-Sheet 14

United States Patent Office 3,354,833
Patented Nov. 28, 1967

3,354,833
DEVICE FOR THE MAGNETIC TRANSMISSION
OF TORQUE
Nikolaus Laing, 35-37 Hofener Weg,
7141 Aldingen, Germany
Filed Nov. 26, 1965, Ser. No. 509,714
Claims priority, application Germany, Nov. 27, 1964,
A 47,710
15 Claims. (Cl. 103—87)

ABSTRACT OF THE DISCLOSURE

Magnetic torque transmission device having a first magnetic member and second magnetic member mounted so that its axis intersects the axis of the first magnetic member at a fixed point whereby one member will have universal movement with respect to the other member.

The invention relates to devices for the magnetic transmission of torque. An example of such a device is a machine having a first driving element comprising a magnet or a magnetisable member for generating a rotating magnetic field and, in spaced and coaxial relationship thereto, a second element comprising a magnet or a magnetisable member with angularly disposed permanent or induced poles of alternate polarities.

Known magnetic machines, such as magnetic clutches or electric motors, can be classified into two groups, radial gap machines, and axial gap machines.

It is a drawback of the radial gap machines that the driven element is not magnetically located in an axially stable position and that axial location must be provided by mechanical bearings, a necessity which in the construction of pumps for instance necessitates the provision of bearings for both radial and axial loading.

The axial gap machines have the drawback that the axial thrust which the bearings of the driven element must support are very high and that even a slight relative tilt of the magnetic planes or unequal magnetisation of the two elements generates very high reactive loads in the bearings (edge pressure) which necessitates either the provision of bearings of considerably larger dimensions than would otherwise be necessary or causes early failure of the bearings.

In the axial magnetic couplings hitherto used in the construction of pumps, two coupling elements have been provided in the form of two permanent magnets separated by a rigid parting wall. The two coupling elements are each journalled on stub shafts attached to the parting wall. However, the slightest asymmetry of either the mechanical or the magnetic forces between the two coupling elements submits the journal bearings to high one-sided loads and one-sided wear causes the bearings to wear laterally, a result which then accentuates the off-centre effects.

The object of the present invention is the provision of a magnetic machine in which the radial forces engendered in the bearings of the driven element are reduced to a minimum.

Another object of the invention is the provision of a simple device for the magnetic transmission of torque, comprising bearings which can be easily assembled, in which bearing friction is slight, and which cannot be choked by fouling.

Another object of the invention is the provision of a magnetic machine, such as a magnetic coupling, in which the parting wall has a form which by virtue of its shape can support considerable pressures.

Furthermore, the invention proposes to reduce the axial and radial bearing loads to a minimum.

It is another object of the invention to provide a pump, principally intended for the circulation of warm water in heating or consumer installations for water, which is associated with a magnetic machine according to the invention. In such a pump the invention also aims at providing a better method of suspending and ventilating the motor.

According to the present invention there is provided a magnetic machine or coupling comprising means for generating a rotating magnetic field including a first ferromagnetic member defining an axis and interior surfaces thereabout, a second ferromagnetic member defining an axis and exterior surfaces thereabout, means mounting the second member so that its axis intersects the axis of the first member in a fixed point, so that relative to the first member it can rotate about its axis and have limited universal movement about said fixed point and so that said interior and exterior surfaces are located for passage of magnetic flux between them, said members each comprising an equal number of pole segments of alternating polarity forming said surfaces and having centres of magnetic actions lying in a plane normal to the respective axis of rotation, the planes of both members lying to the same side of the fixed point with that of the second member nearer thereto than that of the first member.

Since the bearing upon which the second magnet or magnetisable member is mounted, is set at the centre of the sphere defined by the spherical surface of the second magnet or magnetisable member, the second magnet or magnetisable member assumes a stable position about said centre in relation to the first magnet or magnetisable member. In this position the symmetry axes of revolution of both magnets or magnetisable members coincide, and no tilting moments about said centre in planes containing the symmetry axes of revolution are applied by the first magnet or magnetisable member to the second magnet or magnetisable member. In this position furthermore, the radial magnetic forces at the centre nullify each other. The second magnet or magnetisable member is mounted so that it can tilt through a small angle about this centre of symmetry defined by the clearance in the bearings. The essence of the invention resides in the provision of a point bearing for the driven element at the centre of symmetry in which all radial reactive bearing forces are zero and wherein only axial support for the element is required which is simultaneously radially self-centring. Such an effect can be obtained for instance by providing a fixed hemispherical member supporting a rotating likewise hemispherical socket of approximately the same radius. The driven element or the second magnet or magnetisable member can thus be mounted in a bearing which is required to carry no radial loads and only minor axial loads.

The axial loads on the bearing may be adjusted by varying the distance between the two circles which contain the loci of the centres of action of the magnetic forces of both magnets and their distances from the centre of symmetry. These distances are so chosen that when the driven element tilts out of the position of symmetry sufficiently large restoring moments are generated for restoring the driven element to the position of symmetry, whilst ensuring that an axial force of sufficient magnitude will be operative in any possible position of tilt of the driven element for keeping the driven element in engagement with the supporting bearing in the presence of any other forces that may arise in operation, such as the axial thrust of a pump impeller. The bearing is preferably constituted by pairing very hard materials, the revolving member—contrary to conventional bearings—consisting of the harder material. By using such a bearing, pumps can be provided which cannot possibly foul, because any particle of dirt entering the bearing will temporarily force the two bearing members axially apart until the particle of dirt has been ejected.

Suitable materials for the revolving member of the bearing according to the invention are sapphire, sinter corundum or sinter carbide, whereas the stationary member may consist either of the same materials or preferably of a beryllium alloy.

Both elements may have the form of permanent magnets with circularly disposed pole segments of alternating polarities. When used in conjunction with an electric motor the driven element may alternatively have the form of a soft iron core with induced poles. The driving element in such a case is an electromagnet. Finally, one of the two elements may be an eddy current rotor and the driven element may start up at a slower speed than the driving element.

The invention will now be further described by way of example with reference to several embodiments shown in the accompanying drawings in which:

FIGURES 3a to 3h are schematic sectional elevations of different forms of construction of magnetic couplings according to the invention;

FIGURE 4 is an axial sectional elevation of a pump including a magnetic coupling according to the invention, in which the driven element also constitutes the pump impeller. The section shown in FIGURE 4 is taken on the line IV—IV in FIGURE 4a;

In all the drawings parts which perform analogous functions are identified by the same reference numbers. The principle of the proposed arrangement for the magnetic transmission of torque will be described by reference to FIGURES 1 and 2. The reference numbers used in FIGURES 1 and 2 are repeated in the other figures which serve to illustrate details of the proposed magnetic coupling.

Figure 1:
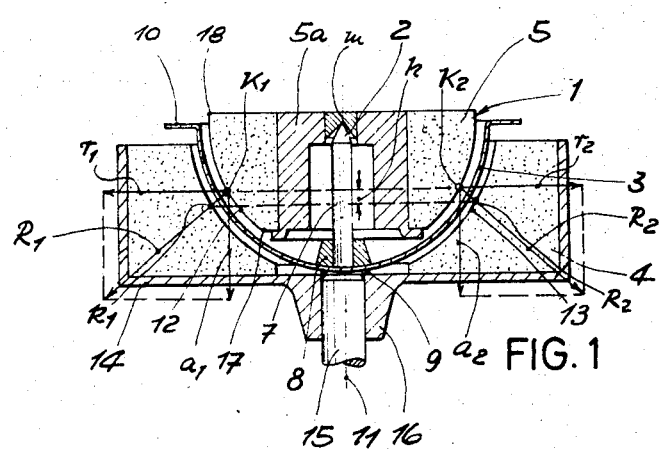
FIGURE 1 is an axial sectional elevation of a magnetic coupling according to the invention in which the driven element and the driving element are shown in position of relative symmetry.
Figure 2:
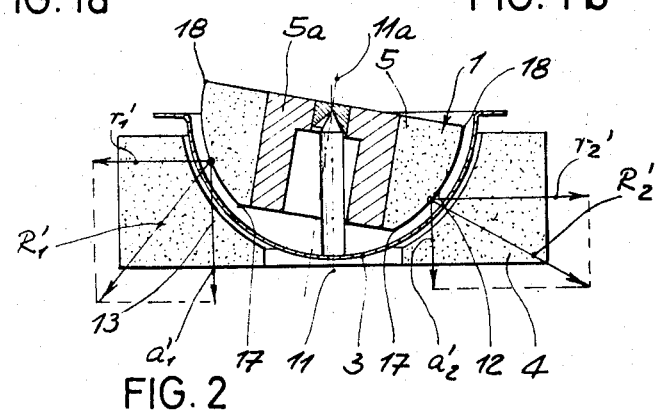
FIGURE 2 is an axial sectional elevation similar to that shown in FIGURE 1, showing the driven element tilted at a small angle out of its position of relative symmetry.

FIGURE 1 is an axial section of the proposed device in its position of symmetry. The device comprises a first magnet 4 contained in a holder 14 and constituting an outer rotor. The holder 14 is firmly mounted on a shaft 15 which may be the drive shaft of an electric motor, and which is fixed in the bore of a hub 16 integral with the holder 14. The first magnet 4 is a ring formed of an even number of equiangularly disposed poles made of a permanent magnet material which has been magnetised and of which neighbouring poles have opposite polarities. The magnetic centres of action $k_1$ and $k_2$, of these poles lie on a first circle in a plane normal to the symmetry axis of revolution 11 of the shaft 15. The centre of this first circle is a point on the axis 11. Alternatively, the magnet 4 may be constituted by a stationary electromagnet which generates a rotating field as will be explained by reference to FIGURES 12 and 13.

The arrangement further comprises a second magnet in the form of a ring 5 of permanent magnet material. This ring 5 is secured on a hollow cylindrical bushing 5a, and is similarly constructed in such a way that an even number of equiangularly disposed poles are formed, neighbouring poles having opposite polarities. Alternatively, the ring 5 may be a piece of soft iron with induced poles. In this case the induced poles represent a preferential magnetic flux path for the field generated by the first magnet 4, so that they define particular stable positions of the soft iron core 5a in relation to magnet 4 about the axis 11. The inner rotor 1 can consequently be rotatably entrained by the rotating field of magnet 4. The magnetic centres of forces $K_1$ and $K_2$ of the poles of the second magnet 5 are located on a second circle in a plane normal to the axis 11. The centre of this second circle is likewise a point on the axis 11 and its distance from the centre of the first circle is $h$.

Inserted into one end of the hollow interior of bushing 5a is a bearing member 6 (FIGURE 1a) formed with a conical socket for the reception of the point 2 of a pivot bearing pin 7. The base of the pin 7 is held in a collar 8 secured by rivets 9 to a parting wall 3 which separates the two magnets 4 and 5. The parting wall 3 has the form of a hemispherical shell formed at its edge with a lip 10.

The inner rotor 1, comprising the magnet ring 5, bushing 5a and the bearing element 6, is freely rotatable about an axis of symmetry 11a which coincides with the axis of symmetry 11 of the outer magnet or outer rotor 4 when the entire system is in a position of symmetry (as illustrated in FIGURE 1). However, the inside rotor is also free to tilt through a small angle α (FIGURE 1a), determined by the difference between the cone angle of the point 2 of the pin 7 and the cone angle of the socket in bearing element 6. The surface 12 of the inner rotor is part of the surface of a sphere of which the centre $m$ coincides with the point 2 of the pin. Consequently the surface 12 will not touch the parting wall 3 if it is tilted about an axis normal to axis 11.

The surface 13 of the outer rotor, which in the position illustrated in FIGURE 1 faces the second magnet 5, preferably defines part of a spherical space also having a centre coinciding with the point of the pin 2, that is the centre of rotation of the inner rotor. The surface 13 is preferably spaced a uniform distance away from parting wall 3, the distance between the parting wall and each of the magnets being determined by the envisaged circumstances of use. For instance, if there is a possibility of a deposit forming in the gap between the surface 12 and the wall 3, then the width of this gap will be arranged to be larger than the gap between the wall 3 and the surface 13. On the other hand, if the outer ring is required to be capable of moving radially with respect to the parting wall, for instance to allow for movement due to an elastically flexible suspension of the driving motor, then the width of the gap between surface 13 and the parting wall 3 will be chosen accordingly.

The second magnet 5 forming the inside rotor is disposed in relation to the first magnet 4 constituting the outer rotor so that in position of symmetry of both magnets the centres of the circles containing the magnetic centres of force, i.e. $k_1$, $k_2$, and $K_1$, $K_2$ are spaced apart and both located on the same side of the centre $m$ of the spherical surfaces formed by the opposing surfaces 12 and 13 of the two magnets 4 and 5. This centre $m$ is at the same time the centre of rotation of the pivot-bearing of the inner rotor 1 comprising the second magnet 5. Hence the forces acting on the inner rotor have a resultant comprising an axial component urging the coned bearing socket 6 on to the point 2.

Thus, in the position shown in FIGURE 1, the axes of rotation 11 and 11a of the two magnets 4 and 5 coincide. In the position illustrated in FIGURE 2 the inner rotor 1 is slightly tilted out of this position of symmetry through a small angle about the centre $m$. This angle may be very small, for instance it may be limited by the clearance in the bearing.

The arrangement proposed by the invention provides a rotor driven by magnetic forces and freely rotatable about its symmetry axis of revolution. This rotor is so mounted with reference to the centre of the sphere defined by the surface of the rotor that a stable position (symmetry position) is determined by the magnetic forces acting on the inner magnet 5. In this stable position there is no tilting moment about the centre $m$ on the rotor or inner magnet in any plane containing the axis of symmetry 11. The sum of the radial forces which act on centre $m$ is therefore zero in this position of symmetry.

In FIGURE 1 the forces $R_1$ and $R_2$ which act on the centres of force $K_1$ and $K_2$ of the magnet ring 5 as well as their radial components $r_1$ and $r_2$ and axial components $a_1$ and $a_2$ are indicated. In the position shown in FIGURE 1, $r_1=r_2$ and $a_1=a_2$. Therefore, the resultant of the forces $R_1$ and $R_2$ coincides with axis 11 and no tliting moment is generated about the centre $m$. This means that the magnet ring 5 is maintained in the illustrated position in relation to magnet 4 by the magnetic forces. Assuming that the magnet ring 5 is thrown by vibration into a position in which the axis 11a does not coincide with the axis of rotation 11, as illustrated for instance in FIGURE 2, then the forces $r'_1$, $r'_2$ and $a'_1$, $a'_2$ cease to be equal and in this position, the components $a'_1$ and $a'_2$ generate a restoring moment on the magnet ring 5 which urges the inner rotor 1 back into the position shown in FIGURE 1.

The resultant axial component of force $a'_1-a'_2$ holds the rotor on the point bearing and only a small resultant radial component $r'_1-r'_2$ urges the rotor in the radial direction when the latter tilts out of its position of symmetry.

The bearing 6 of the inner rotor 1 is constructed so that the forces acting on the point are very small and the resultant wear is minimal. The point 2 and the conical socket preferably consist of extremely hard materials, for example, jewels, particularly sinter corundum or sinter carbide or hard metal, preferably a beryllium alloy.

Figure 1A:
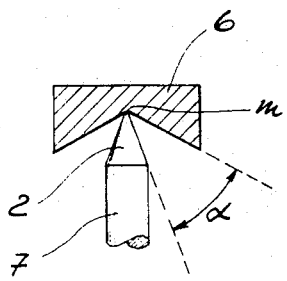
FIGURE 1a is an enlarged fragmentary section of a pivot point bearing for the driven element.
Figure 1B:
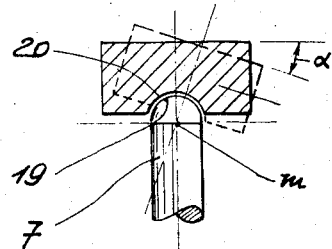
FIGURE 1b is an enlarged fragmentary section of a hemispherical pivot bearing for the driven element.

As has been explained, it is a major feature of the invention that the inner magnet 5 is formed as a segment of a sphere and is tiltable within a small angular range about the centre $m$ of this sphere. In the arrangement illustrated in FIGURE 1, the centre $m$ is the point of the pin 2. The bearing means must be a radially self-centering bearing into which the inner rotor 1 is urged by the axial magnetic forces $a_1$ and $a_2$ irrespectively of its momentary position. FIGURES 1a and 1b illustrate two embodiments of radially self-centering bearings. The form of construction in FIGURE 1a is a point pivot bearing, whereas that shown in FIGURE 1b is a bearing in which the co-operating sliding surfaces are concentric spheres. The bearing surface 19 of the pivot pin 7 in the latter form of construction forms a spherical surface about centre $m$. The radius of this spherical surface is equal to half the diameter of the pivot pin 7, so that the bearing surface 19 is an exact hemisphere. The bearing surface 20 of the socket 6 does not encompass a complete hemisphere and, as indicated by dotted lines, the bearing member can therefore tilt within limits defined by the angle $\alpha$ on pin 7 in the same way as is the case in the point bearing according to FIGURE 1a. This angle $\alpha$ is exaggerated in the drawings. The bearing surface 19 may be conveniently produced by soldering a ball into the open end of a small tube.

Figure 3A:
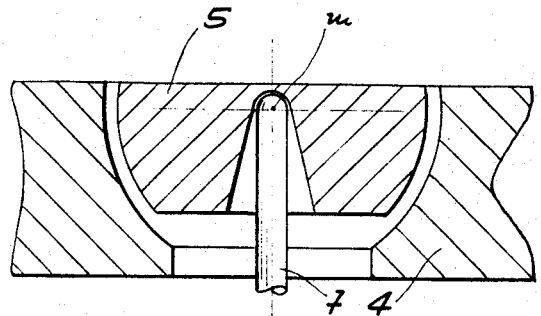
Figure 3B:
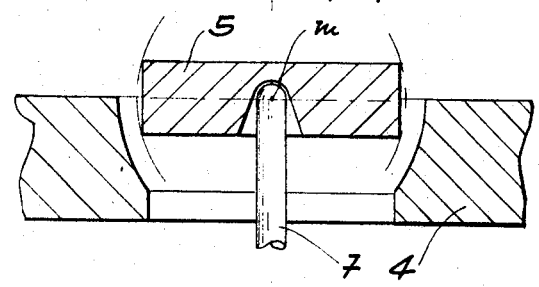
Figure 3C:
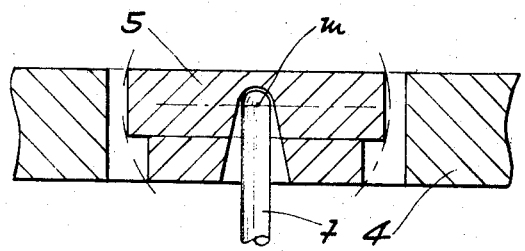
Figure 3D:
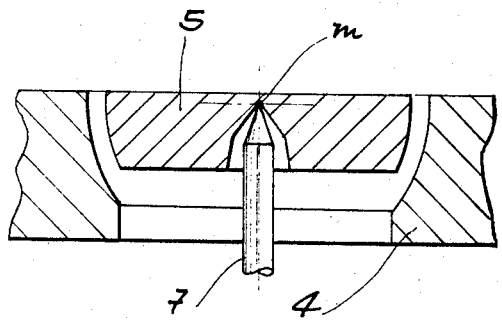

FIGURES 3a to 3h schematically illustrate several other arrangements according to the invention, in which axial magnetic forces act on the inner magnet 5 in such manner that their resultant urges the inner magnet 5 into a position of symmetry and maintains the magnet on the radially self-centering bearing. In the embodiments illustrated in FIGURES 3a to 3f, this effect is achieved by the geometric disposition of the outer magnet 4 in relation to the inner magnet 5. In FIGURES 3g and 3h however, supplementary magnetic devices are provided for the generation of an axial magnetic force which acts on the inner rotor for urging the same on its bearing support 7. In the arrangement illustrated in FIGURE 3g a fixed magnet 4b is provided in the manner indicated in the drawing with ring-shaped poles which face a ring-shaped magnet 5b. The magnet 5b is firmly affixed to the rotor 5. Facing poles are of opposite sign so that the two magnets 5b and 4b attract each other. In the arrangement shown in FIGURE 3h the axial force which pulls the rotor 5 on to its bearing is provided by the force of repulsion generated by a magnet 4a which is magnetised in annular regions.

Figure 4:
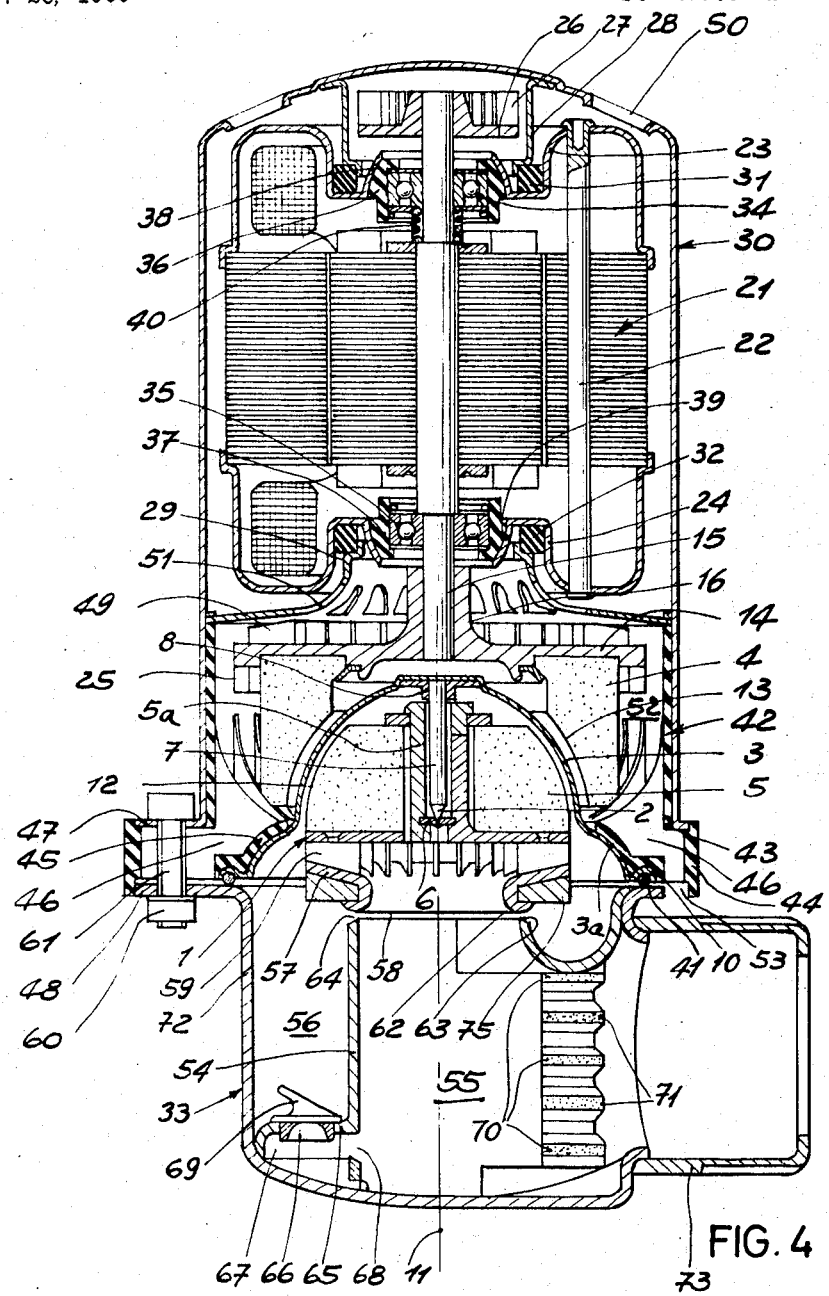

FIGURE 4 is an axial section of a pump which is provided with a magnetic coupling according to the invention. This pump is particularly suitable for hot water supply or heating installations. The pump is driven by a motor 21 which is mounted in the illustrated manner between bearing plates 23 and 24 and held by screws or rivets. The shaft 15 of the motor carries a hub 16 forming a holder 14 for the outer magnet ring 4 which is securely affixed to the holder 14. This magnet ring has equiangularly disposed magnet poles of which neighbouring poles have opposite polarities. The external periphery of the holder is provided with a plurality of equiangularly disposed wings or extensions 25 which can be trimmed so as to balance the outer rotor comprising the holder 14 and the magnet 4. Moreover, the upper end of the motor shaft carries a circular plate 26 with equiangularly disposed blades 27 which can likewise be trimmed for balancing the rotor of the motor.

The motor and the bearing plates 23 and 24 are held in position by annular holders 28 and 29. The upper holder 28 is affixed to the motor casing 30, whereas the lower holder 29 is inserted into the motor casing 30 from below. Between the bearing plates 23, 24 and the holders 28, 29 rings 31, 32 of elastic material, preferably rubber, are interposed. The motor is thus resiliently suspended inside the casing 30 and the pump casing 33. The resilient suspension of the motor by rubber rings substantially assists in assuring that the pump runs smoothly. The gap between the impeller 1 and the outer magnet ring 4 makes allowance for both axial and radial movement of the driving element in relation to the driven element. The suspension of the motor between the elastic rings 31, 32 can thus be associated with a magnetic transmission according to the invention without involving difficulties in construction. The proposed arrangement also eliminates the drawback of known pumps mounted in ball bearings that the unavoidable noise generated in the ball bearings in which the motor shaft is mounted is transmitted through the pump casing into the water circulating system.

The motor shaft itself runs in ball bearings 34 and 35 which are a press fit in socket members 36, 37 respectively. The socket members are received into shells 38, 39 which are integral with the bearing plates 23, 24. The co-operating bearing surfaces of the sockets 36, 37 and of the shells 38, 39 define parts of spheres about centres lying on the axis 11, so that the ball bearings 34, 35 which are contained in the sockets 36, 37 align themselves in positions normal to the said axis. The sockets 36, 37 are urged into the shells 38, 39 by a compression spring 40 which bears against bearing 34 and against a shoulder on shaft 15 of the motor. The magnet ring 4 which is driven by shaft 15 of the motor 21, and which is coaxial with the impeller of the pump, drives the impeller. The two rotors are separated by the cup-shaped parting wall 3 in fluid-tight manner. This parting wall 3 has a bottom annular arched portion 3a carrying a circular lip 10. This lip contains an O-ring 41, which seals the joint between the pump casing 33 and the parting wall 3. The parting wall 3 consists of a material which is a poor conductor of electricity or a non-conductor, and which forms a sealing division in lieu of a stuffing box between the pump casing and the motor casing. The spherical cup shape of the parting wall 3 provides a sealing division which will contain high pressures inside the pump casing without being excessively thick, since the forces arising in the spherical shell are tensile forces coextensive with and in the surface of the shell.

The motor casing 30 is connected to the pump casing 33 by a plastics member 42 comprising a first cylinder 43, a second cylinder 44 and a spherically arched annular portion 45 the parts 43, 44 and 45 being interconnected and supported by web members 46. The first cylinder 43 fits into the bottom of the motor casing 30. The second cylinder 44 supports an annular flange 47 of the motor casing 30 and an annular flange 48 of the pump casing in relatively spaced positions. The web members 46 and the arcuate annular portion 45, press the bottom end 3a of the parting wall into engagement with the pump casing, so that the position of the parting wall 3 is precisely determined and the bottom end 3a cannot resiliently yield. The plastics member 42 consists of a material that is a poor conductor of heat and thus insulates the casing of the pump from the casing of the driving motor.

The motor is cooled by a radial fan comprising blades 49 mounted on the holder 14. The fan draws in air through openings 50 past the motor and then in through openings 51. The air is then forced by the fan through the annular chamber 52 between the first cylinder 43 and the rotating magnet 4, between the web members 46 and discharges to atmosphere through openings 53 in the annular flange 48 of pump casing 33.

Figure 4A:
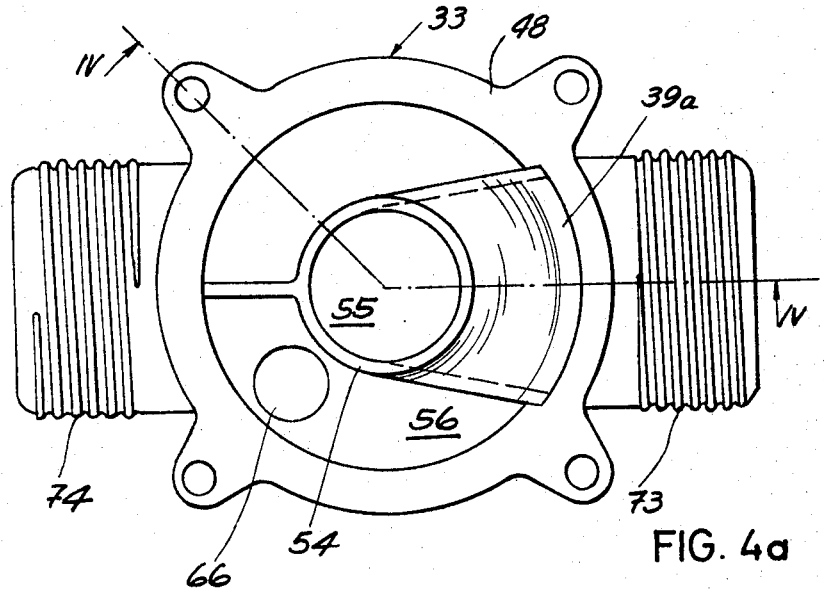
FIGURE 4a is a plan view of the pump casing of the pump shown in FIGURE 4.
Figure 4B:
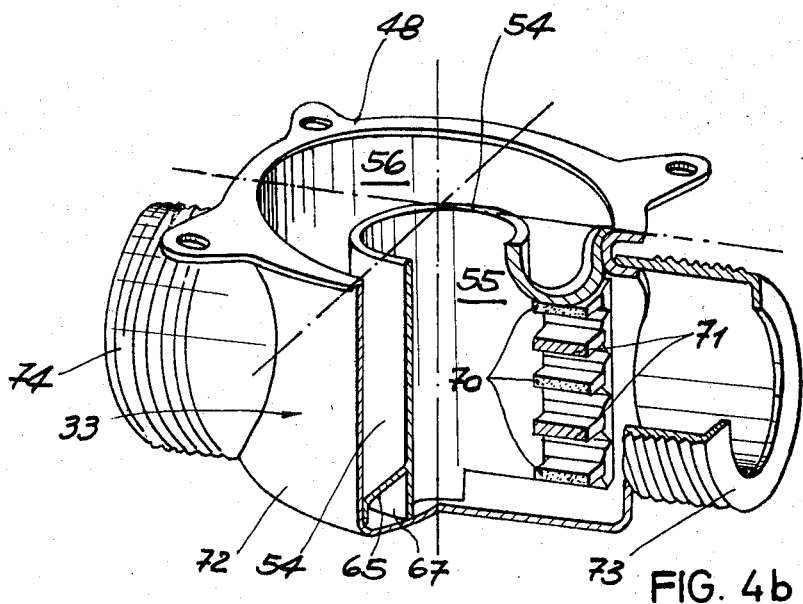
FIGURE 4b is a perspective view of the pump casing illustrated in FIGURE 4, one quadrant of the casing being cut away to show the interior.

A cylindrical partition 54 divides the pump casing 33 into a suction chamber 55 and a pressure chamber 56. The pump casing as such is illustrated in FIGURE 4a in plan and again in FIGURE 4b in perspective, partly cut away. Between the upper end of the partition 54 and the ring surrounding the impeller eye is an annular gap 58 (FIGURE 4). The ring 57 of the impeller 1 simultaneously forms part of the suction chamber. The blades 59 of the impeller are located between the ring 57 and the magnet ring 5. The bushing 5a of the impeller 1 contains the bearing socket 6 for the needle or point 2 at the end of pivot pin 7. The inner rotor is substantially constructed as described by reference to FIGURE 1. The magnet ring 5 can tilt about its centre of rotation defined by the point of the pivot bearing without making contact with any stationary part. In view of the action of the magnetic forces explained by reference to FIGURES 1 and 2 the impeller is urged to remain on the point of the pivot pin 7. Should the pump build up considerable vibrations the impeller 1 is prevented from falling off its seat by the upper end of the partition 54 which defines the gap 58.

The impeller which comprises the magnet ring 5, the bushing 5a, the blades 59 and ring 57 is preferably so constructed that its centre of the rotation is also its centre of gravity. For balancing the impeller, a ring 75 of heavy material such as lead is mounted in the ring 57 in the manner shown in the drawing. Since the centre of rotation of the impeller 1 coincides with its centre of gravity, and tilting of the inner rotor out of its position of symmetry will not give rise to the generation of the out of balance dynamic forces about the centre of rotation which would otherwise arise.

The pump can be removed by releasing the nuts 60 on the bolts 61. The entire motor casing including the plastics member 42 and the parting wall 3 can then be lifted off. The interior of the pump casing thus becomes accessible for the removal of limestone deposits or other detritus.

The ring 57, which, in co-operation with cylinder 54 of the pump casing 33, defines the annular gap 58, terminates in a rounded section 62. The rounding of the section 62 ensures that the fluid streaming from the high pressure chamber 56 through the gap 58 to the suction side 55 will flow smoothly without break-away and the generation of turbulence. This is assisted by the cylindrical partition 54 having a chamfered external edge at 63 forming a gap which converges from the pressure side to the suction side and considerably accelerates the velocity of flow. The point 64 of the partition 54 which is closest to rounded section 62 of the impeller is preferably formed with a sharp edge causing the flow to break away from the partition 54 and to bend around section 62 in virtue of the so-called "coanda" effect.

Inside the pump casing 33 is a wall 65 containing one or preferably several openings 66 of different size which connect the pressure chamber 56 with a chamber 67. The chamber 67 communicates with the suction chamber 55 through an opening 68. The openings 66 are closed by plugs 69 which can be removed from the outside by manipulating them with a screwdriver through branch 74. The suction chamber 55 and the pressure chamber 56 can thus be short-circuited through one or more of these openings 66 by removing the plugs 69. This arangement permits the discharge characteristics of the pump to be conveniently varied. Another possible way of varying the pump discharge characteristics consists in providing the motor, which is preferably of the split phase type, with tapped windings, the particular tap being used which gives the desired speed.

The use of split phase or other motors which have a low starting torque is possible because the inner magnet 5 which carries the pump impeller has a practically negligible break-away torque.

In the suction chamber 55 magnets 70 are provided between iron return plates 71. The arrangement is such that the magnets alternate with iron return plates. The magnets are oriented with their north poles on the outside and their south poles on the inside, that is facing the interior of the partition 54. Each pair of neighbouring magnets are therefore short-circuited by an iron return, thus generating a considerable depth of field in relatively narrow gaps so that any foreign ferromagnetic body, such as scale from the heating pipes, will be retained and prevented from entering the impeller eye.

The pump casing 33 consists of a deep drawn pot 72 with a flange 48. As will be seen more particularly by reference to FIGURES 4a and 4b, the suction and delivery branches 73 and 74 are attached to this deep drawn pot in the form of deep drawn cups. The cups are attached to the pot by welding or soldering. Internal annular flanges 73a and 74a at the ends are provided for making a flush pipe joint.

Figure 5:
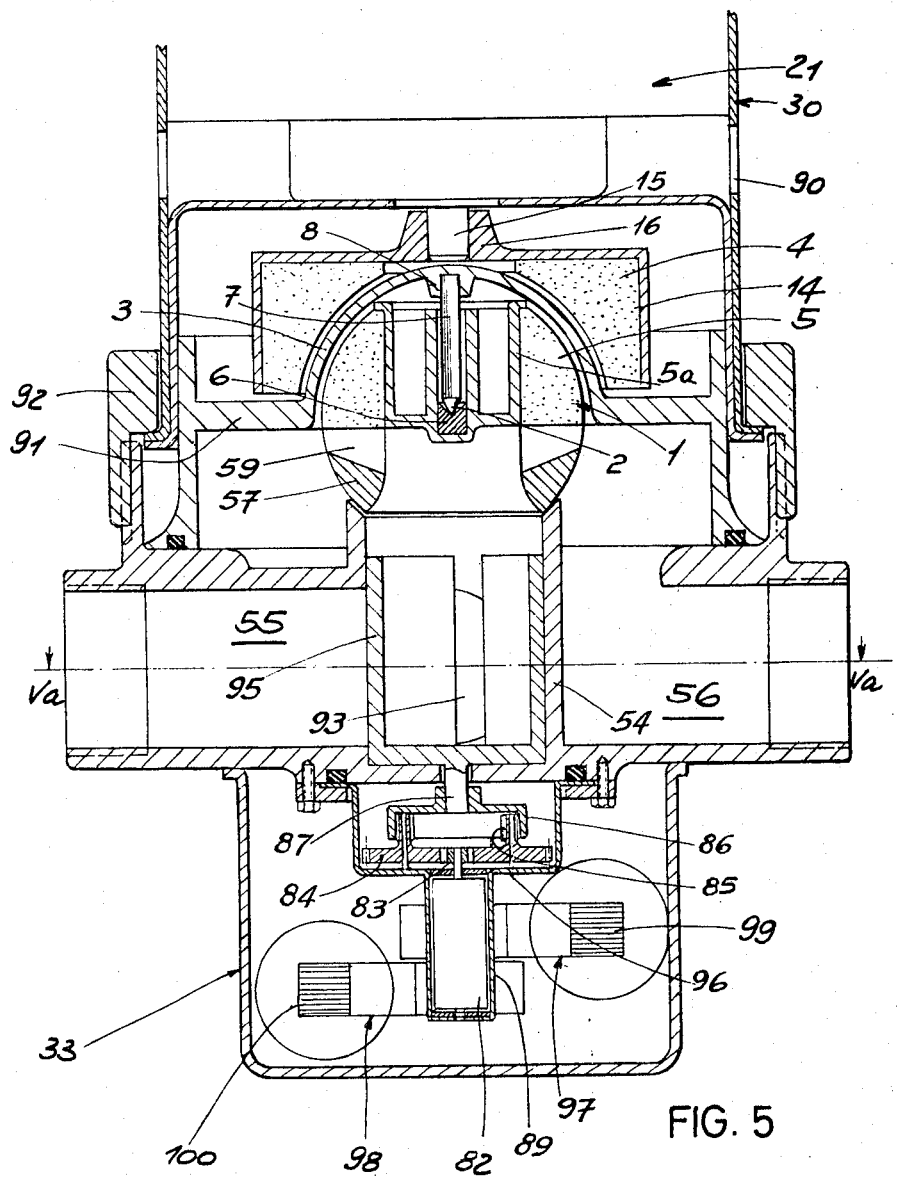
FIGURE 5 is an axial sectional elevation of the lower part of another pump including a magnetic coupling according to the invention, particularly for use as a mixing pump in a central hot water heating system.

FIGURE 5 shows the bottom end of the casing 30 of a hot water circulating pump which is similar to the circulating pump illustrated in FIGURE 4. The motor 21 in this embodiment is likewise air-cooled. The air is drawn in by a fan, not shown, above the motor and leaves through openings 90. The magnetic coupling is constructed in the manner described by reference to FIGURES 1 to 3. The parting wall 3 consists of the same material as the insertion 91 with which it is of integral construction. The proposed construction of the parting wall 3 permits this to be a plastics component which affords the further advantage of reducing eddy current losses to zero.

In the illustrated embodiment the motor casing 30 is connected to the pump casing 33 by a threaded ring 92 which can be slipped over the motor casing. The pump is designed to operate as a so-called mixing pump. Thus an input duct 55 which in this instance carries hot water from the boiler and an output duct 56 which supplies the heating system are arranged in axial alignment whereas in the same plane at right angles thereto a further entry duct 93 (FIGURE 5a) is provided which communicates with the return pipe from the heating system.

Figure 5A:
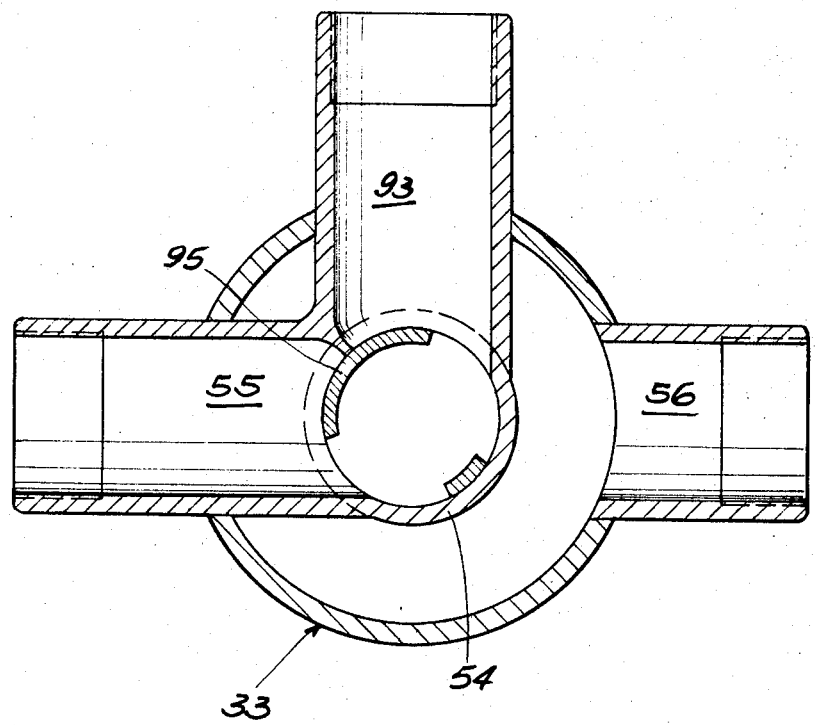
FIGURE 5a is a section taken on the line Va—Va in FIGURE 5.

FIGURE 5a shows this in the form of a section taken on the line Va—Va in FIGURE 5. The entry bush 54 contains a part cylindrical rotary valve 95 which can be rotated from an end position in which only cool return water is pumped from the mixing duct 93 into the input duct 56, into an end position in which only hot water from the boiler is pumped from the suction channel 55 into the input duct 56. In all intermediate positions corresponding proportions from ducts 55 and 93 enter the input duct 56. Preferably the interior of the rotary valve 95 may be magnetic so as to function as a magnetic separator for ferromagnetic foreign material. The separatory effect is assisted by the fact that the stream does not enter centrally but with a swirling action which causes the pieces of material to be thrown against the wall where they are retained.

At the bottom of the pump shown in FIGURE 5, a servo motor is provided for operating the mixing valve 95. The servo motor has a gear casing extended to form a gap tube 89 containing a squirrel cage rotor 82. The shaft of the squirrel cage rotor carries a sun gear 83 of an epicyclic gear train comprising planet gears 84. The planet gears 84 are integral with smaller diameter wheels 85 which drive an internally toothed gear ring 86. The hub of the gear ring 86 is fast on the shaft 87 of the rotary valve 95. Outside the gap tube are two stators 97 and 98 for effecting contrary directions of rotation of the rotor 82 comprising windings 99 and 100 respectively. For rotation in one direction one of the stators is energised and for rotation in the opposite direction the other stator is energised.

Figure 12:
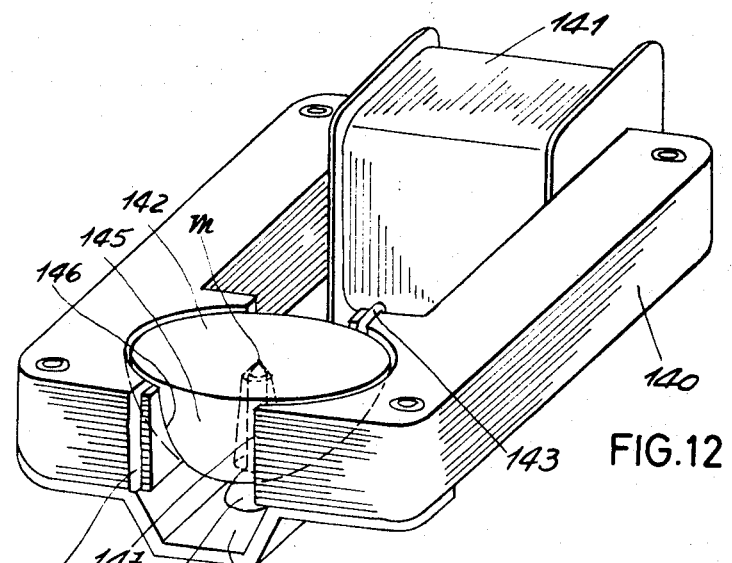
FIGURE 12 is a perspective view of a motor with an armature constructed according to the present invention.
Figure 13:
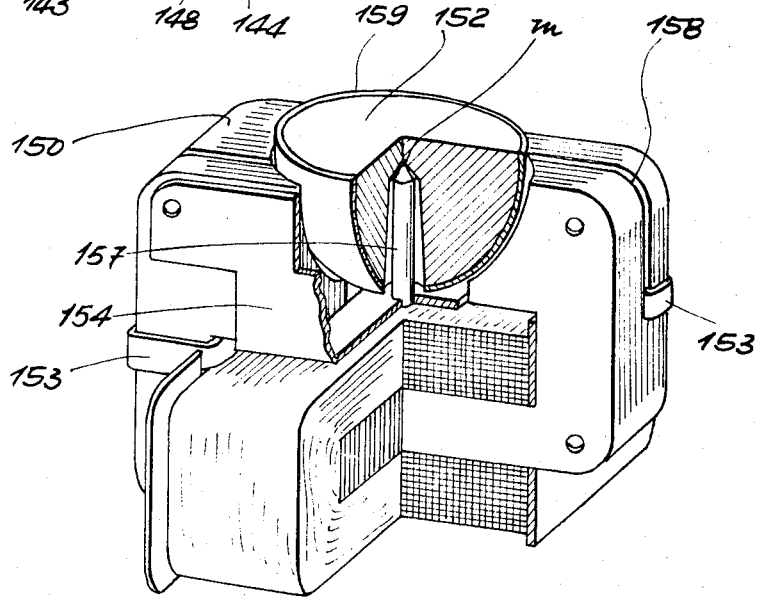
FIGURE 13 is a perspective view of another motor with an armature constructed according to the present invention.
Figure 14:
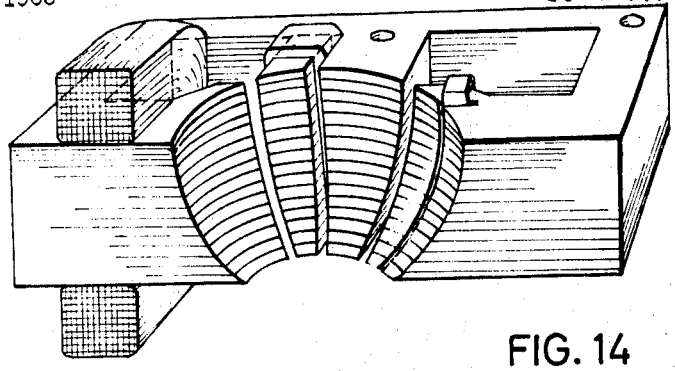
FIGURE 14 is a perspective sectional view of a multipole ring-shaped stator, but otherwise corresponding to the stator illustrated in FIGURE 12.

The impeller 1 of a centrifugal pump of similar construction to that described by reference to FIGURE 3 forms a gap 58 with the partition 54 in the pump casing 33. The pressure gradient between the outside 56 and the inside 55 of this gap is equal to the total pressure gain obtained in the pump. As previously described, a so-called gap current is caused by this pressure gradient through the gap and re-enters the suction side. Should the water be contaminated by suspended particles of dirt, these are likewise forced through the gap. If the diameter of the particles is of the same order of magnitude as the width of the gap they may choke the impeller. A second gap exists between the impeller 1 and the parting wall 3. In pumps in which the rotating field is generated by a motor stator (as shown in FIGURES 12, 13 and 14), this gap is particularly narrow. Particles of dirt may therefore easily become lodged also in this narrow gap.

Figure 6:
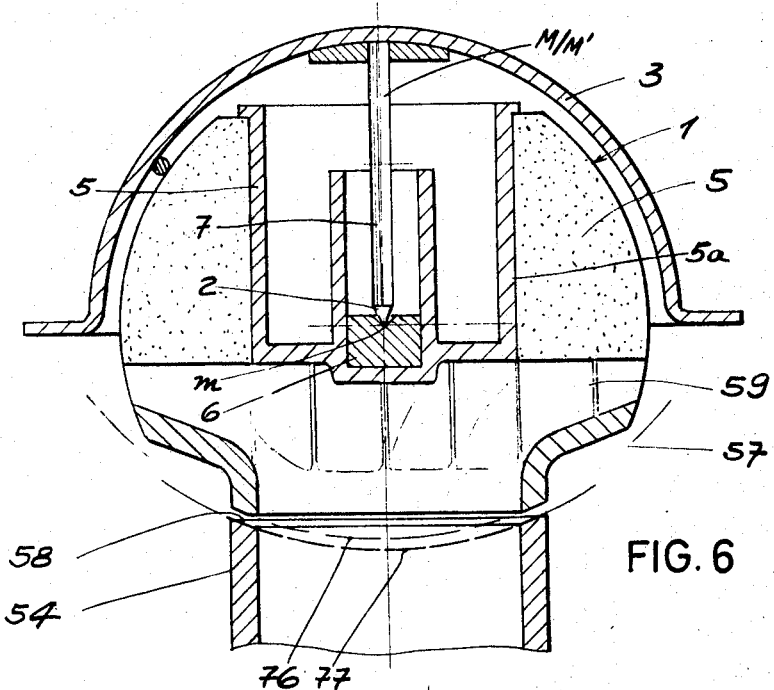
FIGURE 6 is an enlarged axial sectional elevation of the parting wall, the pump impeller and the suction branch of a pump similar to that illustrated in FIGURE 4, the impeller being shown in position of symmetry.
Figure 7:
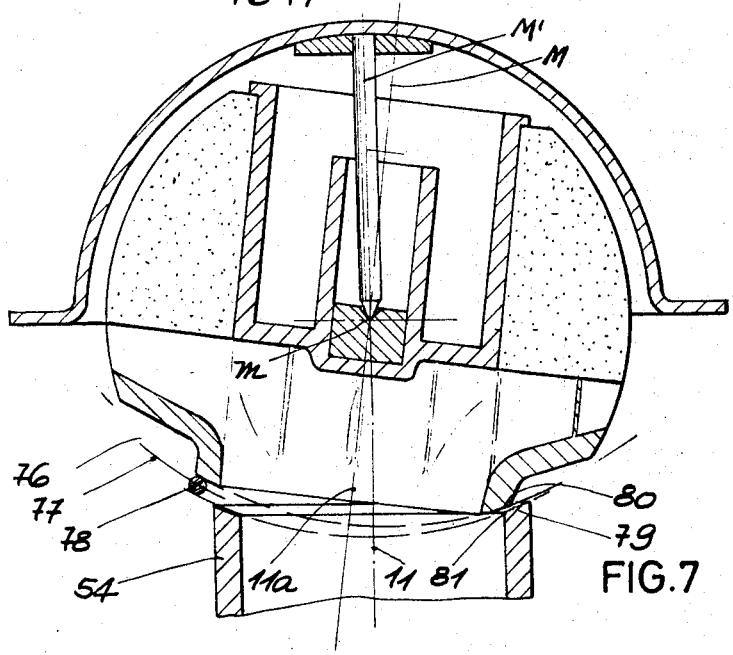
FIGURE 7 is an enlarged axial section of the pump impeller shown in FIGURE 6 tilted out of its position of symmetry.

For overcoming this difficulty, FIGURES 6 and 7 illustrate the centrifugal impeller of a pump which is magnetically located, and which is not affected by particles of dirt entering the above mentioned gaps. In these two FIGURES 6 and 7 only the impeller 1 comprising the ring magnet 5, the bushing 5a, the blades 59 of the impeller wheel and the ring 57 as well as the parting wall 3 and the bearings of the impeller 1 are shown. The loci of movement of the bounding surfaces of the gap 58 in this embodiment of the invention are defined by the spherical sectors 76 and 77. The centres M and M' of these sectors are located beyond the centre m of the impeller from the point of view of the position of the gap. The centre M of sector 76 lies on the rotor axis 11a, whereas the centre M' of sector 77 lies on the axis 11 of the pin 7, that is on the produced axis of the partition 54.

FIGURE 6 shows a particle of dirt lodged between the rotor 1 and the parting wall 3. This causes no permanent blockage because the rotor can yield a slight amount axially.

FIGURE 7 shows a particle of dirt 78 that has been forced into the gap 58. If the diameter of this particle exceeds the width of the gap 58 the rotor will tilt about an axis normal to the plane of the drawing about its centre at m. This causes the width of the gap to increase where the particle 78 has lodged, whereas the gap on the diametrically opposite side at 79 is reduced. The dimensions are so chosen that the edge 80 of the impeller ring 57 can just clear the edges 81 of the entry bush 54 without fouling. The particle of dirt will therefore now be injected along a spiral path. As soon as the impeller has been freed it will be restored into its position of symmetry by the action of the magnetic forces.

Figure 8:
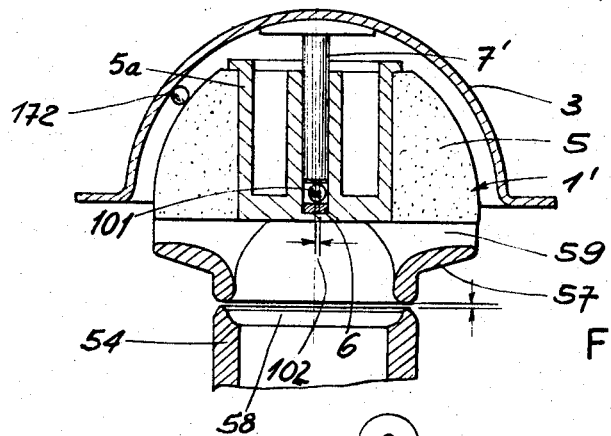
FIGURE 8 is an axial sectional elevation of the pump impeller including a modified form of construction according to the invention.

FIGURE 8 is a modified form of construction of the bearings of the inner rotor. The illustrated inner rotor 1' again comprises a ring magnet 5, a bushing 5a, a bearing 6 inserted into the bushing, impeller blades 59 and a ring 57 which in co-operation with the entry bush 54 defines a gap 58. In contrast to the inner rotor illustrated in FIGURES 1, 2, 3 and 5 the present inner rotor 1' is mounted on a stub shaft 7'. The axial thrust is carried by a ball 101 which has a diameter that is only slightly smaller than the diameter of the stub shaft 7' so that the centre of the ball will circulate on a circular path of diameter 102. If a particle of dirt 172 should enter the gap between the parting wall 3 and the ring magnet 5, the rotor in the embodiment in FIGURE 8 will be urged axially downwards, its maximum downward displacement being limited by the width of gap 58. The particle of dirt 172 will then be outwardly ejected along a spiral path. The parting wall 3 and the external contours of the ring magnet 5 may be so contrived that the gap slightly widens towards the outside.

The provision of protective temperature-responsive cut-out switches in motors is known in the art. However, such a known switch is unsuitable for conventional hot water circulating pumps because the temperature of the motor is mainly determined by the temperature of the hot water. Consequently expensive protective switches for the motor must be provided or the motors must be overdimensioned.

In the hot water circulating pumps which have been described above, the motors are air-cooled. The cooling air is forced through an annulus of holes between the motor and the pump. This provides an effective thermal insulation between the casing of the pump and the casing of the motor so long as the motor is running and cooling air is being drawn in. Additional thermal insulation for the motor is provided between the motor casing and the pump casing by the plastics member 42 shown in FIGURE 4.

In the case of pumps for circulating consumer water a thermostat is provided for stopping the circulation of hot water as soon as the latter has reached a prescribed temperature. This thermostat may be located in the bottom part of the motor casing between the outer rotor 4 and the first cylindrical member 43 of the plastics component 42 (FIGURE 4). The plastics component 42 will then afford reasonable protection to the temperature-responsive switch from the water in the pump casing. The temperature-responsive switch and the insulation must be so matched that the pump will be stopped when the circulated water has reached a given temperature level. The heat from the motor will not penetrate to the temperature-responsive switch because the latter is exposed to the cooling draught of air. However, when the motor ceases to run or if the cooling channels should be choked, preventing the motor from being sufficiently cooled, then the absence of the cooling current of air will permit heat from the hot motor to affect the temperature-sensitive switch. This will then be heated to beyond the preset temperature of response even if the water in the pump is still cold. The switch will therefore break the electric circuit and protect the motor from damage.

Figure 9A:
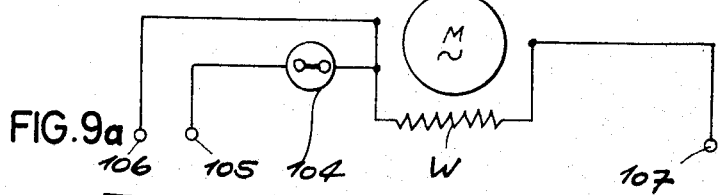
FIGURES 9a to 9c are parts of the electrical system of a pump including a construction according to the invention and equipped with a thermostat.
Figure 9B:
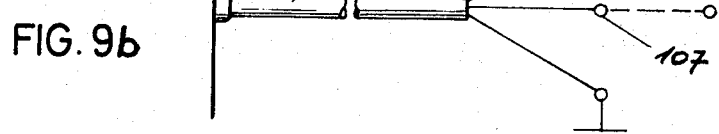
Figure 9C:
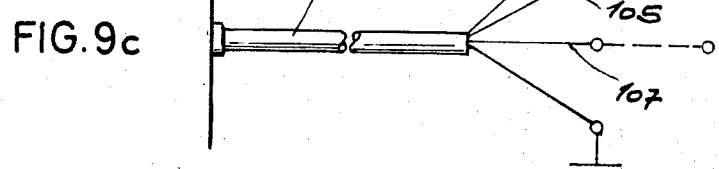

FIGURE 9a is a circuit diagram for a hot water circulating pump which can be operated with or without a temperature-sensitive protective switch 104. The motor windings are schematically indicated in FIGURE 9a by W. If the temperature-responsive switch 104 is by-passed to the connection of terminal 106 instead of terminal 105 to the mains together with terminal 107, the temperature-sensitive switch 104 will not rupture the circuit when the temperature is excessive and the switch opens.

According to the present invention the motor is not connected to the mains by a three-wire cable but by a four-wire cable. If it is desired to operate the pump under the control of a protective temperature-sensitive switch, the terminals 105 and 107 are connected to the mains, whereas terminal 106 is simply insulated. If the pump is to operate without a temperature-responsive switch, then terminal 105 as well as terminal 106 are both connected to the same mains terminal, whereas terminal 107 is connected to the other terminal of the mains. This greatly simplifies connecting the pump in accordance with the desired type of application. If the speed of the motor is to be selectably adjustable by using different taps the additional connections are similarly taken to the outside and that particular tap is connected which gives the desired driving speed.

Figure 10:
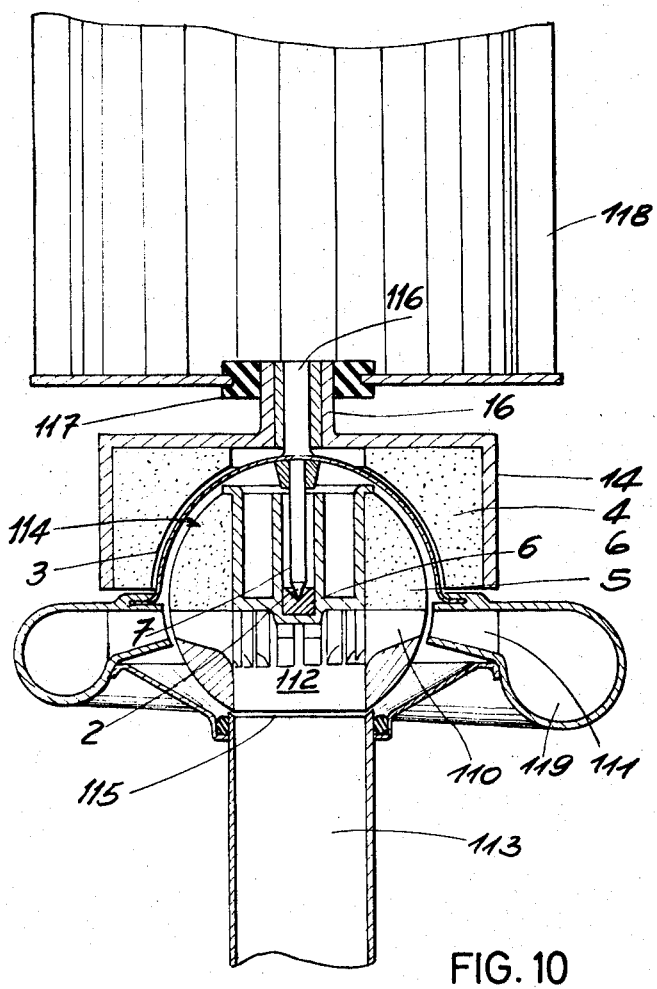
FIGURE 10 is an axial sectional elevation of a reaction turbine associated with a torque-transmitting coupling according to the invention.

FIGURE 10 illustrates a reaction turbine having vanes 110 which are secured to the magnet 5.

Guide vanes 111 of an inlet duct 119 supply water inwards to the runner, and the water leaving outlet 112 enters a draft tube 113. A gap is formed between the draft tube 113 and the runner 114, the bounding surfaces of the gap being parts of concentric spheres centered at the point of the pivot bearing 2. On the convex side of the parting wall 3 is a stub shaft 116 upon which the hub 16 of a holder 14 for the outer rotor is mounted. With the interposition of a rubber bush 117, the hub 16 of holder 14 carries a fan rotor 118. This arrangement is intended more particularly for convector heaters which can be driven by the water leaving the heat exchanger which is then taken to the turbine through duct 119 and thus driven the fan of the convector heater.

Figure 11:
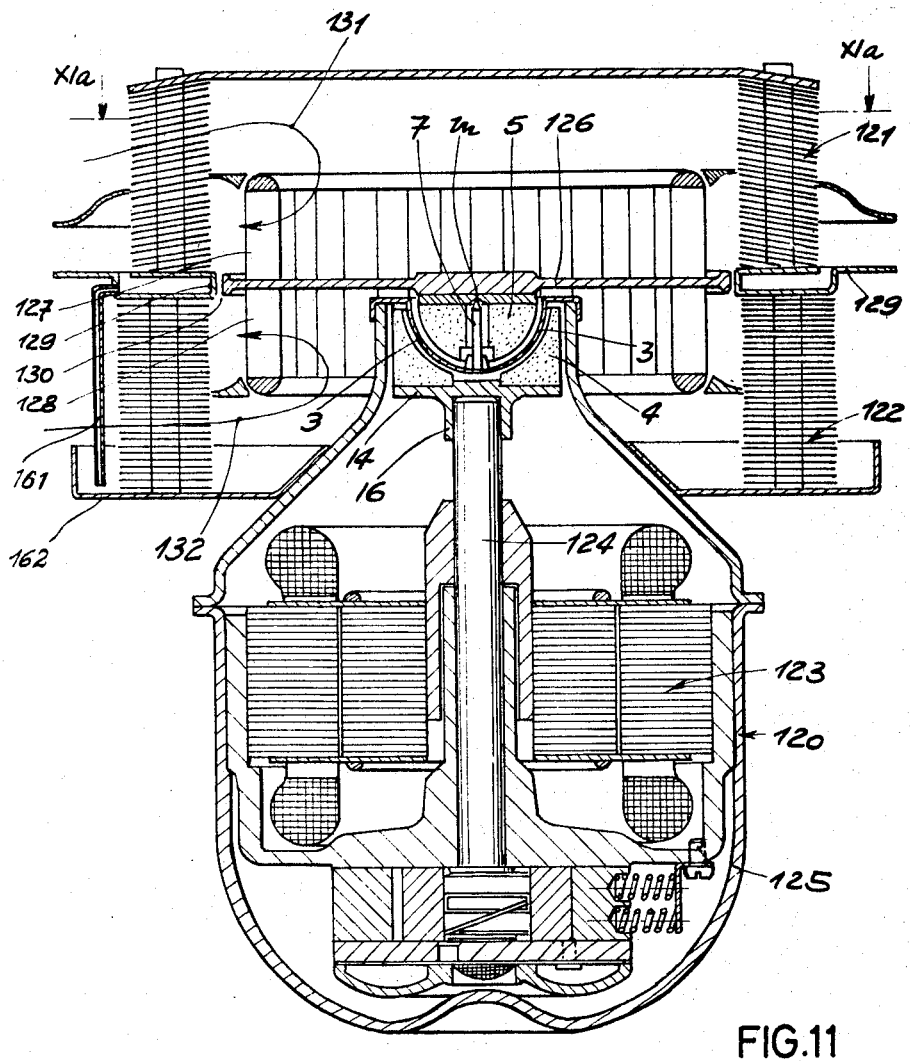
FIGURE 11 is an axial sectional elevation of a refrigeration unit incorporating a torque-transmitting coupling according to the invention.

FIGURE 11 illustrates a refrigerating machine comprising a compressor 120, an evaporator 121 and a condenser 122. The compressor motor 123 drives the outer rotor 4 of a magnetic coupling through a shaft 124, hub 16 and the holder 14. The compressor casing 125, in conjunction with the cup-shaped membrane 3, separates the interior of the compressor from its surroundings. The inner rotor comprising the ring magnet 5 is firmly connected to a wheel disc 126 of light material which carries fan blading 127 and 128 on each side. The centre portion of the disc 126 is thickened and in co-operation with the dividing wall 129 forms a sealing gap 130. The bounding surfaces of this gap 130 preferably form parts of spheres which are concentric about the centre $m$ of the spheres defining the opposed surfaces of the magnet rotors 4 and 5. The fan conveys air through the heat exchangers 121 and 122 as indicated by arrows 131 and 132. If the wall 129 is the wall of a refrigerating cabinet, then the radial fan and its blades 127 will draw air through the evaporator 121, blowing it back through the evaporator into the interior of the cabinet. This causes the air to be cooled. On the other side of the wall 129, the blades 128 of the fan draw in air through the condenser 122 and return it through the condenser into the outside of the cabinet, so that this air can dissipate the heat picked up in the condenser.

Figure 11A:
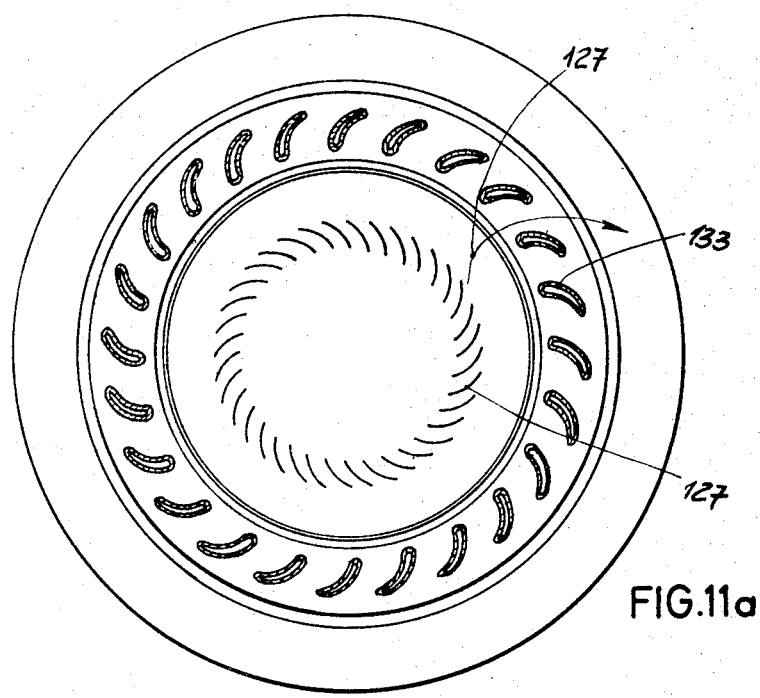
FIGURE 11a is a plan view of the apparatus illustrated in FIGURE 11.
Figure 13A:
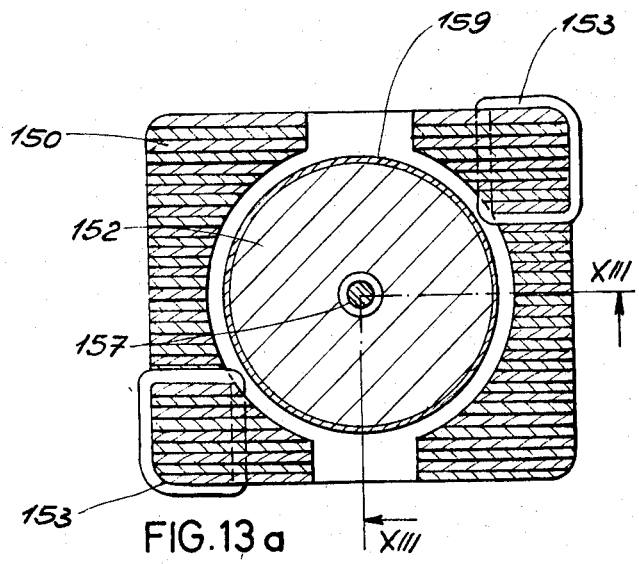
FIGURE 13a is a section taken on the line XIIIa—XIIIa in FIGURE 13.

In the sectional drawing of FIGURE 11a it will be seen that the tubes 133 of the refrigerating machine have a profiled cross section which reduces the resistance of the heat exchanger to the passage of air, since the tubes have the effect of stator nozzles.

Details of the compressor and of the pipe connections from the compressor to the heatt exchangers are not shown. These parts are of conventional construction. When the compressor is stopped, the heat from the condenser 122 rises into the evaporator 121 and thaws it out. The condensed water runs through pipes 161 into a pin 162, whence it evaporates during the next working cycle. The proposed type of bearing which requires no lubrication permits the construction of a refrigerator unit which requires no maintenance whatsoever.

FIGURES 12 to 14 are schematic perspective views of electric motors having rotors which run in bearings constructed and devised as proposed by the present invention. Generally speaking all kinds of induction motors are suitable for the purposes of the invention. The illustrations show split phase motors having rotors consisting of hemispherical permanent magnets. If a two-pole stator is provided the rotor has an odd number of pairs of poles, whereas stators with an odd number of poles require rotors with an even number of pairs of poles.

In the motor shown in FIGURE 12 a winding 141 induces an alternating magnetic flux in a laminated core 140. The short circuit winding at 143 causes a rotating field to be generated where the rotor 142 is located. The laminated core is mounted in conventional manner on a bearing plate 144. The rotor 142 runs on a point bearing at the centre $m$ of the concentric spherical surfaces which contain the opposing faces 145 and 146 of the rotor and stator. In the perspective view shown in FIGURE 12 a parting wall is not shown between rotor and stator. However, it will be understood that such a parting wall may be provided in the manner illustrated and described in the preceding examples. Moreover, the pumping elements or the like attached to rotor 142 and preferably adapted statically and dynamically to balance the rotor in such a way that point $m$ coincides with the centre of gravity, are likewise omitted.

The rotor 142 may again be supported on the point of a pivot pin 147 fixed in a holder 148 which is itself firmly fitted into the bearing plate 144.

In the embodiment illustrated in FIGURE 12 the sheets of the laminated core are perpendicular to the symmetry axis of revolution of the rotor when the latter is in position of symmetry.

In the motor shown ni FIGURE 13 the laminations 150 are horizontal with respect to this axis. For structural reasons the short-circuit winding 153 is here located between the coils and the pole. The gap 158 of the split-phase motor can be readily provided by the interposition of a shorter sheet in the lamination. The rotor 152 is freely rotatable on centre $m$ about its symmetry axis of revolution and can tilt within a small angle about any axis through $m$ normal to the axis of symmetry. Pin 157 which forms the point pivot bearing is firmly fitted into the bearing plate 154.

In the embodiment shown in FIGURE 13 the rotor 152 is enveloped by a copper shell 159. The provision of this shell converts a rigid coupling which has no slip or a synchronous motor which cannot slip into a magnetic machine which starts up with slip or in the manner of an asynchronous motor.

The rotor of an electric motor according to the invention may have 2n–1 pairs of poles. This permits an electric motor to be constructed which runs for instance as a six-pole motor with only one single coil.

The permanent magnet rotor may also be replaced by a so-called squirrel cage rotor, that is a rotor comprising an iron armature with a squirrel cage winding. Moreover, a rotor with permanent magnet poles may be replaced by a soft iron member with induced poles functioning as a magnetic return path which assumes a given position in the stator field.

Apart from the advantages that have already been mentioned, a motor according to the invention permits very small magnets having high field strengths to be used. The small size of the rotor minimises friction in gap-tube pumps. A speed reduction in proportion to the number of pairs of poles is also possible in the case of a two-pole stator (for instance a speed of 1000 r.p.m. in the case of a two-pole stator with a six-pole rotor at 50 c./s.).

FIGURE 14 shows an annular stator with several poles but otherwise corresponding to the stator shown in FIGURE 12.

Figure 15:
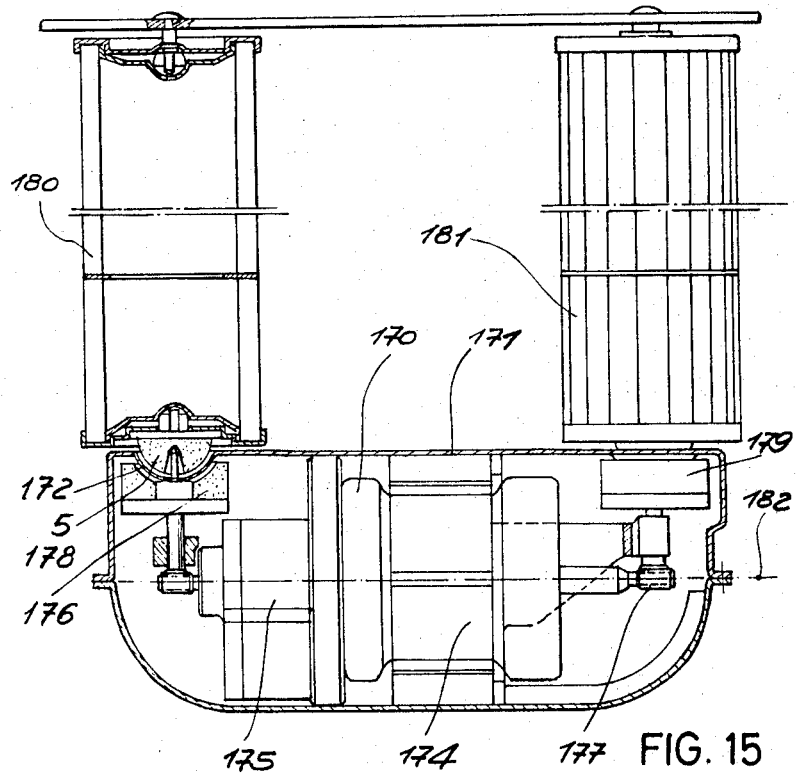
FIGURE 15 is a sectional elevation of another example of an application of the proposed magnetic machine for magnetically transmitting torque.

FIGURE 15 is a fan drive for air conditioning installations. The compressor 170 is contained in a hermetically sealed casing 171 which is provided with fine steel hemispherical parting shells 172 at each end. In addition to driving the compressor 175 the motor 174 also drives the outer magnets 178 and 179 through worm gear transmissions 176 and 177. The outer magnets drive the inner magnets 5 which in turn drive the fan rotors 180 and 181. Since the compressor performs a small reactive movement about axis 182 when it is started up, the inner magnets 5 must allow for a slight degree of deflectability.

Whereas air conditioning installations hitherto comprised at least one, and frequently two, fan motors in addition to the compressor and these—unlike the compressor—require occasional lubrication, the invention provides a solution in which only one motor, namely the compressor motor is needed and no lubrication whatsoever is required.

I claim:

1. A magnetic machine or coupling comprising means for generating a rotating magnetic field including a first ferromagnetic member defining an axis and interior surfaces thereabout, a second ferromagnetic member defining an axis and exterior surfaces thereabout, means mounting the second member so that its axis intersects the axis of the first member in a fixed point, so that relative to the first member it can rotate about its axis and have limited universal movement about said fixed point and so that said interior and exterior surfaces are located for passage of magnetic flux between them, said members each comprising an equal number of pole segments of alternating polarity forming said surfaces and having centres of magnetic action lying in a plane normal to the respective axis of rotation, the planes of both members lying to the same side of the fixed point with that of the second member nearer thereto than that of the first member.

2. A magnetic machine or coupling as claimed in claim 1 wherein said centres of magnetic action define a cone having an apex coinciding with said fixed point.

3. A magnetic machine or coupling as claimed in claim 1 wherein said first and second ferromagnetic members each comprises a plurality of equiangularly disposed magnetic segments, whereof adjacent segments have alternative polarities.

4. A magnetic machine or coupling as claimed in claim 1, wherein said first member comprises the stator of an electric motor.

5. A magnetic machine or coupling as claimed in claim 1, wherein said second member has a surface defining a spherical segment.

6. A magnetic machine or coupling as claimed in claim 5, wherein said first member has an internal surface spaced from said second member and defining a corresponding spherical segment.

7. Refrigeration means including a magnetic coupling as claimed in claim 1, comprising an electric motor including a shaft said first member being mounted on said shaft, said second member including fan means mounted thereon.

8. Air conditioning means including magnetic couplings as claimed in claim 1, comprising a motor, a compressor operatively connected to said motor and two fan rotors for forcing air through an evaporator portion and a condenser portion said motor including a double ended shaft, each end of said shaft ends mounting one of said first members, and said rotors each being mounted on one of said second members for rotation therewith, said first and second members of each coupling being separated by a partition.

9. A magnetic machine or coupling comprising means for generating a rotating magnetic field including a first ferromegnetic member defining an axis and interior surfaces thereabout, a second ferromagnetic member defining an axis and exterior surfaces thereabout, means mounting the second member so that its axis intersects the axis of the first member in a fixed point, so that relative to the first member it can rotate about its axis and have limited universal movement about said fixed point and so that said interior and exterior surfaces are located for passage of magnetic flux between them, said members each comprising an equal number of pole segments of alternating polarity forming said surfaces and having centres of magnetic action lying in a plane normal to the respective axis of rotation, the planes of both members lying to the same side of the fixed point with that of the second member nearer thereto than that of the first member; said second member being mounted on a radially self-centering point pivot bearing.

10. A magnetic machine or coupling comprising means for generating a rotating magnetic field including a first ferromagnetic member defining an axis and interior surfaces thereabout, a second ferromagnetic member defining an axis and exterior surfaces thereabout, means mounting the second member so that its axis intersects the axis of the first member in a fixed point, so that relative to the first member it can rotate about its axis and have limited universal movement about said fixed point and so that said interior and exterior surfaces are located for passage of magnetic flux between them, said members each comprising an equal number of pole segments of alternating polarity forming said surfaces and having centres of magnetic action lying in a plane normal to the respective axis of rotation, the planes of both members lying to the same side of the fixed point with that of the second member nearer thereto than that of the first member; said second member being mounted on a substantially hemispherical pivot.

11. A magnetic machine or coupling as claimed in claim 10, wherein said second member includes a bearing socket defining a segment of a sphere for co-operation with said hemispherical pivot.

12. Fluid pumping means including a magnetic machine or coupling for generating a rotating magnetic field; said machine or coupling including a first ferromagnetic member defining an axis and interior surfaces thereabout, a second ferromagnetic member defining an axis and exterior surfaces thereabout, means mounting the second member so that its axis intersects the axis of the first member in a fixed point, so that relative to the first member it can rotate about its axis and have limited universal movement about said fixed point and so that said interior and exterior surfaces are located for passage of magnetic flux between them, said members each comprising an equal number of pole segments of alternating polarity forming said surfaces and having centres of magnetic action lying in a plane normal to the respective axis of rotation, the planes of both members lying to the same side of the fixed point with that of the second member nearer thereto than that of the first member; and said fluid pumping means comprising an electric motor, said first member being mounted on the shaft of said motor for rotation therewith and defining a substantially hemispherical inner contour, a substantially hemispherical partition secured in spaced relation from said contour, said second member being mounted for rotation on a point bearing secured on said partition coaxially with said shaft, said second member further comprising means constituting a pump impeller for cooperation with guide means comprising a pump casing including inlet and outlet ducts.

13. Fluid pumping means as claimed in claim 12, wherein said inlet duct comprises a cylindrical partition co-axial with said impeller, the terminal periphery of said cylindrical partition being spaced from said impeller by a small amount so as to leave a narrow annular gap.

14. Fluid pumping means as claimed in claim 13, wherein said impeller further comprises an annular member including an axially rounded annular periphery facing said terminal periphery of said cylindrical partition.

15. Means for converting hydraulic power into mechanical torque including a magnetic coupling for generating a rotating magnetic field; said coupling including a first ferromagnetic member defining an axis and interior surfaces thereabout, a second ferromagnetic member defining an axis and exterior surfaces thereabout, means mounting the second member so that its axis intersects the axis of the first member in a fixed point, so that relative to the first member it can rotate about its axis and have limited universal movement about said fixed point and so that said interior and exterior surfaces are located for passage of magnetic flux between them, said members each comprising an equal number of pole segments of alternating polarity forming said surfaces and having centres of magnetic action lying in a plane normal to the respective axis of rotation, the planes of both members lying to the same side of the fixed point with that of the second member nearer thereto than that of the first member; and wherein said first member includes means defining a turbine rotor and said second member is mounted for rotation on a partition spaced from said first member, said partition including in connection therewith inlet duct means surrounding said turbine rotor.

References Cited

UNITED STATES PATENTS

| | | | |
|---|---|---|---|
| 1,568,304 | 1/1926 | Williams | 310—104 |
| 2,395,065 | 2/1946 | Rataiczak | 230—139 X |
| 2,810,349 | 10/1957 | Zozulin | 103—87 X |
| 3,139,832 | 7/1964 | Saunders | 103—87 X |

ROBERT M. WALKER, *Primary Examiner.*